April 9, 1940.   J. M. LARSON   2,196,927
PNEUMATIC CONTROL SYSTEM
Filed Oct. 22, 1937
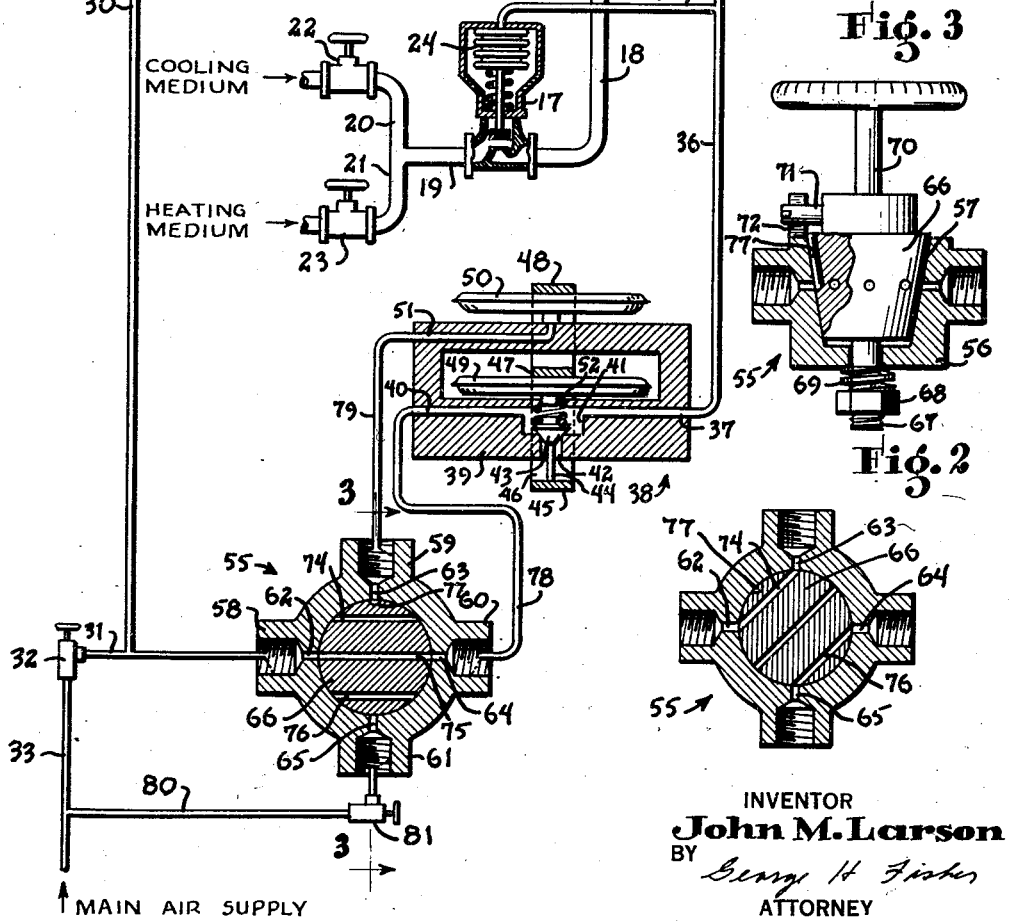
INVENTOR
John M. Larson
BY George H. Fisher
ATTORNEY Patented Apr. 9, 1940

2,196,927

UNITED STATES PATENT OFFICE 2,196,927

PNEUMATIC CONTROL SYSTEM

John M. Larson, Chicago, Ill., assignor to Minneapolis-Honeywell Regulator Company, Minneapolis, Minn., a corporation of Delaware Application October 22, 1937, Serial No. 170,421

7 Claims. (Cl. 236—1)

This invention relates to automatic control systems of the pneumatic type, and has for its object the provision of a simple and dependable automatic control arrangement for controlling combined heating and cooling systems, or analogous systems in which the control sequence must be reversed for different periods of operation.

In the art of air conditioning it has been common to provide systems which are arranged for cooling a space or enclosure during the summer and for heating such space during the winter, such systems either employing separate heating and cooling devices, or a single conditioning device through which cooling fluid is circulated in summer and through which heating fluid is circulated during the winter. During summer operation of the system, it is necessary that the control apparatus act reversely to the manner necessary for winter operation. Thus in summer, upon an increase in space temperature it is necessary to increase the cooling action of the system, which requires opening of the cooling fluid control valve (if the system is controlled in such manner), while in winter it is necessary to cause opening of the heating fluid control valve when the space temperature decreases. It is an object of my invention to provide for controlling systems of this type by means of a single thermostat or other condition responsive device.

A further object of my invention is the provision of a novel arrangement for reversing the relationship between a pneumatic motor and a controller therefor, such arrangement including a reversing relay and a valve device for either connecting the controller directly to the pneumatic motor or for operatively interposing the reversing relay in the connections between the controller and motor.

Another object of my invention is the provision of a novel selective valve arrangement which readily adapts itself for placing the reversing relay of a system of the type mentioned into or out of operation, and which also is readily adaptable for providing change in control sequence in other types of pneumatic control systems.

Other objects and advantages of my invention will appear from the following description and the appended claims.

For a full disclosure of my invention, reference is made to the following detailed description and to the accompanying drawing, in which Figure 1 diagrammatically shows a pneumatic control system embodying the principles of my invention, Figure 2 is a view of the changeover valve in a different position from that shown in Figure 1, and Figure 3 is an elevation, partly in section, of the changeover valve shown in Figures 1 and 2.

Referring to Figure 1, reference character 1 indicates a conditioning chamber which may be connected at its inlet end to a return duct 2 leading from a space to be conditioned 3. Conditioning chamber 1 may be provided with the usual fresh air inlet duct 4 and also may be connected at its discharge end to a fan 5 which in turn discharges into a discharge duct 6 leading to the space 3. Located within the conditioning chamber 1 is a heat exchange coil 7, a by-pass 8 in the conditioning chamber being provided for this coil by means of a baffle 9. The relative volumes of air passed across the heat exchange coil 7 and through the by-pass 8 may be controlled by means of face dampers 10 and by-pass dampers 11, these dampers being connected to an operating member 12, this operating member being arranged for operating the dampers in unison and in a manner to cause closing of one set of dampers simultaneously with opening of the other set. The damper operating member 12 may be connected to the operating lever 13 of a damper motor generally indicated as 14, this damper motor being of usual form and including a bellows or diaphragm 16 which is so arranged with respect to the lever 13 as to cause closing of the face dampers 10 when the fluid pressure within the bellows 16 is increased, and for causing opening of the face dampers 10 when the fluid pressure applied to said bellows is decreased.

The heat exchange coil 7 is arranged for providing cooling of the air in summer and for heating the air in winter, the amount of cooling or heating done by the coil 7 being in part controlled by means of a direct acting control valve 17 which is connected to the fluid supply line 18 leading to said heat exchange coil. The inlet of valve 17 is connected by pipes 19, 20 and 21 to stop valves 22 and 23. The valve 22 may be connected to a source of cooling medium while the valve 23 may be connected to a source of heating medium. It will be understood that during summer operation of the system the valve 23 will be closed for preventing the supply of heating medium to coil 7 and the valve 22 will be opened for causing cooling medium to be supplied to said heat exchange coil. In winter, it will be understood that valve 22 is closed while valve 23 is opened. Referring to control valve 17, this valve may be of a form well known in the art and includes a bellows or diaphragm 24 which is arranged for causing closing of the valve upon increase in fluid pressure applied to said diaphragm, and for permitting opening of the valve upon decrease in such fluid pressure.

The damper motor 14 and the control valve 17 are arranged to be controlled by means of a room temperature responsive controller 25 where may be of usual form, including a cylindrical thermostatic element 26 which actuates a flapper valve 27 through the medium of a rod 28. Upon an increase in temperature at thermostat 25, the element 26 will expand, this permitting movement of flapper valve 27 towards or into engagement with a bleed port 29, which bleed port is connected by pipes 30 and 31 to a restriction 32 which in turn is connected to a main air supply pipe 33. Due to the restricting action of the restriction 32, movement of the flapper valve 27 toward or away from the bleed port 29 will cause change in pressure within the control line formed of pipes 30 and 31.

The damper motor 14 and the control valve 17 are actuated or controlled by means of the thermostat 25. During summer operation of the system, it is necessary that the relationship between the thermostat 25 and the damper motor 14 and valve 17 be the reverse of the relationship between these elements necessary during winter operation. For obtaining this reversal, the damper motor 14 and valve 17 are connected by a control line formed of pipes 34, 35 and 36 to the outlet passage 37 of a reversing relay generally indicated as 38. This reversing relay may take any desired form but is preferably of the type shown and described in the application of John M. Larson and Karl Figenbaum, Serial No. 158,744 filed August 12, 1937. This type of reversing relay includes a base member 39 having therein an inlet passage 40 which communicates with the outlet passage 37 through an intermediate passage 41, which in turn communicates with a vent passage 42. The vent passage 42 is formed at its upper end to provide a valve seat which cooperates with a valve member 43, this valve member being secured at its lower face to a stem 44 which in turn is secured to the cross arm 45 of a yoke 46, this yoke extending around the base member 39 and including cross arms 47 and 48, the cross arm 47 being attached to the upper face of a diaphragm 49, while the cross arm 48 is attached to the upper face of a diaphragm 50. The diaphragm 49 is secured at its lower face to the base member 39 and its interior communicates with the intermediate passage 41. The diaphragm 50 is also secured at its lower face to the base member 39 and its interior communicates with a control pressure passage 51. The valve member 43 is urged downwardly by means of a spring 52, this action tending to collapse the diaphragms 49 and 50.

When this reverse acting relay 38 is in operation, a restricted flow of air is supplied to the inlet passage 40 while the variable control pressure is supplied to the inlet passage 51. If the maximum air pressure is, for instance, 15 pounds per square inch, the spring 52 will be so designed as to just urge valve 43 against its seat when the sum of the pressures in diaphragms 49 and 50 is equal to 15 pounds. For instance, if no pressure exists in the diaphragm 50, it will require a pressure of slightly over 15 pounds per square inch in diaphragm 49 to lift valve member 43 off its seat. If, however, a pressure of 7½ pounds per square inch exists in the control diaphragm 50, a pressure of only slightly over 7½ pounds per square inch in the diaphragm 49 will be necessary for lifting valve member 43 from its seat. By this arrangement, if the control pressure applied to the bellows 50 is increased, the valve member 43 will be lifted from its seat, thereby allowing venting of the air from the intermediate passage 41 to atmosphere, this resulting in lowering of the air pressure within chamber 41 and consequent lowering of pressure within the bellows 49. Lowering of pressure in the bellows 49 will in turn reduce the total force holding valve 43 open, which causes valve 43 to approach its seat for establishing a pressure within chamber 41 which is reduced an amount corresponding to the increase in pressure applied to the diaphragm 50. Due to the diaphragms 49 and 50 being of equal diameter, it will be apparent that an increase in control pressure applied to diaphragm 50 will be accompanied by an equal decrease in pressure established by the relay 38 in the control line for damper motor 14 and valve 17. Conversely, a decrease in control pressure applied to diaphragm 50 will be accompanied by an increase of equal value in the pressure applied to the damper motor and control valve.

For placing the relay 38 into or out of operative control of the damper motor and valve, a selective valve device 55 is provided, this device being in effect interposed between the thermostat 25 and the relay 38. Valve 55 comprises a valve casing 56 having a conical bore 57 therein (Figure 3), this bore communicating with exterior connections 58, 59, 60 and 61 by means of ports 62, 63, 64 and 65 respectively. Located within the bore 57 is a conical valve member 66, this valve member being urged into engagement with the bore by means of a threaded stem 67 secured thereto, this stem extending through the lower wall of the valve casing and engaging a nut 68, this nut being adapted to tighten a spring 69. The upper end of the valve member 66 may be attached to a suitable operating stem 70 and also may include a pin 71 which is adapted to engage a stop member 72 for limiting the movement of said valve member. Referring to Figure 1, it will be noted that valve member 66 is provided with three parallel ports or passages 74, 75 and 76. When the valve member 66 is in the position shown in Figure 1, the valve port 62 is placed into communication with the valve port 64 by passage 75, and the valve ports 61 and 63 are blocked off. When, however, the valve member 66 is rotated to the position shown in Figure 2, the port 62 is connected to the port 63 by means of the passage 74, while the port 64 is connected to the port 65 by means of the passage 76.

The valve member 66 is also provided with a longitudinal passage 77 which is so positioned in the valve member 66 as to engage the port 63 when the valve member is in the position shown in Figure 1. The purpose of this longitudinal passage will become apparent as this description proceeds.

With the valve member 66 in the position shown in Figure 1, the control line 30—31 of thermostat 25 is connected to the inlet passage 40 of the reverse relay through port 62, passage 75, port 64 and conduit 76. Also, at this time the control diaphragm 50 of the relay is vented to atmosphere through pipe 79, port 63 and passage 75

77. This venting of the diaphragm 50 will permit the full air supply pressure to be applied to the diaphragm 49 without causing opening of the valve 43. This will therefore cause the valve 43 to be held closed at all times, and for this position of valve member 66, the reversing relay will be out of operation.

The position of valve member 66 shown in Figure 1 is the winter position. Therefore, at this time the valves 22 and 23 will be positioned for supplying heating fluid to the heat exchange coil 7. If desired, damper motor 14 may be so designed as to hold the face dampers 10 at their maximum closed position when the pressure applied thereto is equal to 13 pounds per square inch, and to cause said face dampers 10 to be completely open when the control pressure is reduced to zero. The control valve 17 may be so designed as to be held completely closed when the control pressure is at 15 pounds per square inch and to be wide open when the control pressure is reduced to 11 pounds per square inch.

If now should the space temperature be excessive, the flapper valve 27 of the thermostat will completely close bleed port 29, thereby allowing the full 15 pounds per square inch supply line pressure to be built up within the damper motor diaphragm and the control valve diaphragm, this causing the control valve to shut off the flow of heating medium to the heat exchange coil 7 and also causing the face dampers 10 to be at their maximum closed position. Therefore, for this condition no heat will be supplied to the space being conditioned. As the space temperature decreases, flapper valve 27 will be caused to allow bleeding of air from bleed port 29, which will first allow partial opening of the control valve 17 for admitting heating medium to heat exchange coil 7. When the space temperature falls to such a value that the control line pressure is reduced to 13 pounds, the valve 17 will be half-open, while the face dampers 10 will be still in the minimum flow position. Upon further decrease in temperature, the face dampers 10 will begin opening, thereby increasing the passage of air across heat exchange coil 7. It will be apparent that upon further decrease in space temperature the control valve 17 will become wide open and the face dampers will be opened wider and wider for increasing the amount of heat supplied to the conditioned space.

For summer operation of the system, the valves 22 and 23 will be positioned for disconnecting the heating medium supply from the heat exchange coil 7, and for connecting the cooling medium supply thereto. Also the valve member 66 of the selector valve 55 will be shifted to the position shown in Figure 2. For this position of the valve member, the control line 30—31 of the thermostat 25 will be connected to the control diaphragm 50 of the reversing relay through port 62, passage 74, port 63 and conduit 79. Also, the air supply main 33 will be connected to the inlet passage 40 of the reversing relay by means of conduit 80, restrictor 81, port 65, passage 76, port 64 and conduit 78. This will cause a restricted flow of air to be supplied to the inlet passage 40 of the reversing relay, this restricted air supply permitting the valve member 43 of the reversing relay to establish varying pressures in the outlet passage 37 of said reversing relay. From the foregoing description, the action of the system should now be apparent. Upon an increase in temperature at thermostat 25, the flapper valve 27 will reduce the amount of air bled from the bleed port 29, this causing a rise in pressure within the control line 30—31 of said thermostat, this control pressure being applied to the diaphragm 50 of the relay. This increase in pressure within the control diaphragm 50 will cause lifting of the valve member 43 for reducing the air pressure applied to the damper motor and control valve an amount equal to the increase in pressure applied to the control diaphragm 50. This decrease in pressure applied to the damper motor 14 and the control valve 17 will have the effect of permitting said valve to open further for increasing the flow of cooling medium through the heat exchange coil 7, and for opening further the face dampers 10 for increasing the amount of air passed across said coil, this of course having the result of increasing the cooling effect of the system for counteracting the rise in temperature.

From the foregoing description, it will be apparent that I have provided a summer-winter changeover for a pneumatic system which permits a single thermostat to control the system for increasing the amount of cooling done upon temperature increase during summer operation, and for increasing the amount of heating done upon a decrease in temperature during winter operation, this result being secured by my novel selective valve arrangement which selectively places a reversing relay into or out of operation. While for purposes of illustration I have shown and described a specific embodiment of my invention, it will be apparent that many changes may be made without departing from the spirit and scope of my invention. I therefore desire to be limited only by the scope of the appended claims as construed in the light of the prior art.

I claim as my invention:

1. In a system of the class described, in combination, a device to be controlled comprising a fluid pressure actuated motor arranged to move in one direction upon an increase in fluid pressure applied thereto and to move in another direction upon a decrease in such pressure, condition responsive means connected to said pressure actuated motor for varying the pressure applied thereto in accordance with changes in the condition to which said condition responsive means responds, means in the connections between said condition responsive means and said pressure actuated motor for reversing the changes in pressure caused by said condition responsive means, and valve means for placing said reversing means into or out of operation, and add in a manner to reverse the control action of said condition responsive means on said pressure actuated motor.

2. In a system of the class described, in combination, a device to be controlled comprising a fluid pressure actuated motor arranged to move in one direction upon an increase in fluid pressure applied thereto and to move in another direction upon a decrease in such pressure, a source of fluid under pressure, condition responsive means connected to said source of fluid under pressure and having a control line, said condition responsive means being arranged to vary the pressure in said control line in accordance with changes in value of the condition to which said condition responsive means responds, a reversing relay connected to said pressure actuated motor for reversing the change in pressure caused by said condition responsive means, and means for selectively connecting said control line to said pressure actuated motor or to said reversing relay.

3. In a system of the class described, in combination, a plurality of devices to be controlled, each comprising a fluid pressure actuated motor arranged to move in one direction upon an increase in fluid pressure applied thereto, and to move in another direction upon a decrease in such fluid pressure, condition responsive means for controlling said devices to be controlled, said condition responsive means being arranged to vary the pressure applied to said pressure actuated motors in accordance with changes in the condition to which said condition responsive means responds, a reversing relay interposed between one of said pressure actuated motors and said condition responsive device for reversing the direction of the change in pressure caused by the condition responsive means, and a rotatable valve device interposed between said condition responsive means and said reversing relay, said valve device being arranged for selectively connecting said condition responsive means to said reversing relay, or directly to one of said pressure actuated motors.

4. In a system of the class described, in combination, a device to be controlled comprising a fluid pressure actuated motor arranged to move in one direction upon an increase in fluid pressure applied thereto and to move in another direction upon a decrease in such pressure, a source of fluid under pressure, condition responsive means connected to said source of fluid under pressure and having a control line, said condition responsive means being arranged to vary the pressure in said control line in accordance with changes in value of the condition to which said condition responsive means responds, a reversing relay for reversing the change in pressure caused by said condition responsive means, said reversing relay including a pressure actuated controlling device, an outlet passage, and means controlled by said pressure actuated controlling device for varying the pressure in said outlet passage inversely to the pressure applied to said pressure actuated controlling device, conduit means connecting said outlet passage to the pressure actuated motor of said device to be controlled, and means for selectively connecting said control line of the condition responsive means to the pressure actuated device of said reversing relay, or directly to the pressure actuated motor of said device to be controlled.

5. In a system of the class described, in combination, a device to be controlled comprising a fluid pressure actuated motor arranged to move in one direction upon an increase in fluid pressure applied thereto and to move in another direction upon a decrease in such pressure, a source of fluid under pressure, condition responsive means connected to said source of fluid under pressure and having a control line, said condition responsive means being arranged to vary the pressure in said control line in accordance with changes in value of the condition to which said condition responsive means responds, a reversing relay for reversing the change in pressure caused by said condition responsive means, said reversing relay comprising an inlet passage, an outlet passage, a pressure actuated controlling device and means controlled by said controlling device for establishing in said outlet passage a pressure which varies oppositely to pressure applied to said controlling device, conduit means for connecting said outlet passage to the pressure actuated motor of said device to be controlled, and selective valve means for selectively connecting the control line of said condition responsive means to said controlling device of said relay or to the inlet passage of said relay, said valve means being also arranged to connect a source of fluid under pressure to said inlet passage when said control line of the condition responsive means is connected to said controlling device of said relay, and to bleed fluid from said controlling device when said control line is connected to said inlet passage.

6. In a system of the class described, in combination, a device to be controlled comprising a fluid pressure actuated motor arranged to move in one direction upon an increase in fluid pressure applied thereto and to move in another direction upon a decrease in such pressure, a source of fluid under pressure, condition responsive means connected to said source of fluid under pressure and having a control line, said condition responsive means being arranged to vary the pressure in said control line in accordance with changes in value of the condition to which said condition responsive means responds, a reversing relay for reversing the change in pressure caused by said condition responsive means, said reversing relay comprising an inlet passage, an outlet passage, a pressure actuated controlling device and means controlled by said controlling device for establishing on said outlet passage a pressure which varies oppositely to pressure applied to said controlling device, conduit means for connecting said outlet passage to the pressure actuated motor of said device to be controlled, and selective valve means for selectively connecting the control line of said condition responsive means to said controlling device of said relay or to the inlet passage of said relay, said valve means being also arranged to connect a source of fluid under pressure to said inlet passage when said control line of the condition responsive means is connected to said controlling device of the reversing relay, and to bleed fluid from said controlling device when said control line is connected to said inlet passage, said selective valve means comprising a valve casing having a first port connected to said control line of the condition responsive device, a second port connected to the controlling device of the relay, a third port connected to the relay inlet passage, and a fourth port connected to a source of fluid under pressure, and a rotary valve member associated with said casing and said ports, said valve member being arranged to place said first port into communication with said second port, and said third port into communication with said fourth port when the valve member is in one position, and to place said first and third ports into communication and bleed said second port when said valve member is in another position.

7. In a system of the class described, in combination, a pair of pressure actuated devices to be controlled, a source of fluid under pressure, a condition responsive device having a control line connected to said source of fluid under pressure, said condition responsive device being arranged to establish different pressures in said control line in accordance with variations in the condition to which said condition responsive device responds, and a rotary valve means for selectively placing said condition responsive means in control of one of said pressure actuated devices or the other, said rotary valve means comprising a valve casing having a plurality of spaced valve ports and a rotary valve member cooperating with said ports, said valve member having therein a plurality of separate passages out of communication with each other and arranged for registration with said valve ports in a manner to connect different valve ports together for different positions of said valve member, and a longitudinal slot in said rotary valve member arranged for registration with one of said valve ports when said valve member is moved to a predetermined position, said slot being arranged to connect the port with which it registers to atmosphere, for thereby venting one of said pressure actuated means when the said rotary valve member is positioned to connect said condition responsive device to the other of said pressure actuated means.

JOHN M. LARSON.

CERTIFICATE OF CORRECTION.

Patent No. 2,196,927.　　　　　　　　　　　　　　　April 9, 1940.

JOHN M. LARSON.

It is hereby certified that error appears in the printed specification of the above numbered patent requiring correction as follows: Page 3, second column, lines 53 and 54, claim 1, strike out the comma and words ", and add"; page 4, second column, line 29, claim 6, for "on" read --in--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.